United States Patent [19]

Nakata

[11] 3,896,369

[45] July 22, 1975

[54] CIRCUIT FOR SOFT-STARTING ELECTRIC LOAD COMPRISING TEMPERATURE SENSITIVE DIAC

[75] Inventor: Josuke Nakata, Itami, Japan

[73] Assignee: Mitsubishi Denki Kabushiki Kaisha, Japan

[22] Filed: Aug. 27, 1974

[21] Appl. No.: 500,855

[30] Foreign Application Priority Data

Aug. 30, 1973 Japan .............................. 48-97651

[52] U.S. Cl. ........... 323/19; 307/252 B; 307/252 N; 307/252 T; 307/310; 323/24; 323/20; 323/36; 323/38

[51] Int. Cl. ............................................. G05f 1/44

[58] Field of Search .............. 323/19, 20, 22 SC, 24, 323/34, 35, 36, 38, 39, 41, 68, 69; 307/252 B, 252 N, 252 T, 310

[56] References Cited

UNITED STATES PATENTS

| | | | |
|---|---|---|---|
| 3,511,972 | 5/1970 | Shaffer, Jr. | 323/19 |
| 3,544,766 | 12/1970 | Muskovac | 307/252 T |
| 3,590,365 | 6/1971 | Nelson | 323/19 |
| 3,821,634 | 6/1974 | Sabolic | 307/252 B X |

OTHER PUBLICATIONS

Electronic Applications, Vol. 28, No. 3, pgs. 85–94, "Diac Triggering of Thyristors and Triacs" by J. Rozenboom, Dec. 10, 1968.

*Primary Examiner*—Gerald Goldberg
*Attorney, Agent, or Firm*—Robert E. Burns; Emmanuel J. Lobato; Bruce L. Adams

[57] ABSTRACT

A circuit for triggering a bidirectional thyristor having a capacitor charged from an ac source includes a semiconductor thermally sensitive switch having a break-over voltage dependent upon a temperature and applied with a voltage across the capacitor. Upon the closure of an ON-OFF switch, the capacitor voltage reaches the break-over voltage to break the semiconductor switch over to turn the thyristor on at a large firing angle resulting in a current flowing through a load. Then the semiconductor switch is heated by a heating resistor connected across the load to decrease in the break-over voltage to decrease the firing angle of the thyristor until a steady-state current flows through the load.

7 Claims, 4 Drawing Figures

CIRCUIT FOR SOFT-STARTING ELECTRIC LOAD COMPRISING TEMPERATURE SENSITIVE DIAC

BACKGROUND OF THE INVENTION

This invention relates to a soft-starting circuit for soft-starting an electric load while an excessive rush current is suppressed upon starting the load, that is, when a current is initiated to flow through the load.

It is well known that, upon starting some type of electric loads or upon closing the associated electric source, an excessive current tends to rush into the loads. Electric loads in which that excessive current comes particularly in question involve electric lamps, electric motors, electric heaters etc. As will be widely known, circuits for soft-starting loads by suppressing excessive rush currents occurring upon the start thereof have included the thyristor controlled in its firing angle. More specifically, a capacitor has been connected to a source of alternating current through a variable resistor and provided a voltage for triggering the thyristor while the firing angle of the thyristor had been controlled by changing the magnitude of resistance of the variable resistor. That variable resistor has been adapted to be controlled so as to make the magnitude of its resistance high upon starting the associated load. Further the voltage across the capacitor has been caused to be raised at a slow rate thereby to increase the firing angle of the thyristor ensuring that an excessive current is prevented from rushing into the load. Those conventional circuits have been necessary to use special means for controlling the magnitude of resistance of the variable resistor with resulting the troublesome control.

It is an object of the present invention to provide a new and improved soft-starting circuit for automatically soft-starting a load with a simple circuit configuration and without the necessity of controlling a variable resistor such as above described.

SUMMARY OF THE INVENTION

According to the principles of the present invention, there is provided a circuit for soft-starting an electric load, comprising, in combination, thyristor means serially connected to an electric load across a source of alternating current, circuit means including a capacitor connected to the source and a semiconductor thermally sensitive switch element having a break-over voltage decreased with an increase in temperature, the circuit means being operative to trigger the thyristor in response to the break-over of the semiconductor thermally sensitive switch element due to a voltage across the capacitor exceeding the break-over voltage of the semiconductor thermally sensitive switch element, and electric heater means thermally coupled to the semiconductor thermally sensitive switch element to be electrically energized during a flow of load current through the load.

Preferably, the thyristor means may be a bidirectional thyristor and the semiconductor thermally sensitive switch element may be a semiconductor element capable of being broken over in each of the opposite directions.

The electric heater means may be advantageously be connected in parallel to the load.

The semiconductor thermally sensitive switch element may conveniently comprise three semiconductor layers of alternate conductivity type and a pair of P-N junctions formed therebetwee, and the electric heater means may be positioned to change a temperature at each of the P-N junctions.

BRIEF DESCRIPTION OF THE DRAWING

The present invention will become more readily apparent from the following detailed description taken in conjunction with the accompanying drawing in which.

DESCRIPTION OF THE PREFERRED EMBODIMENT

Figure 1:
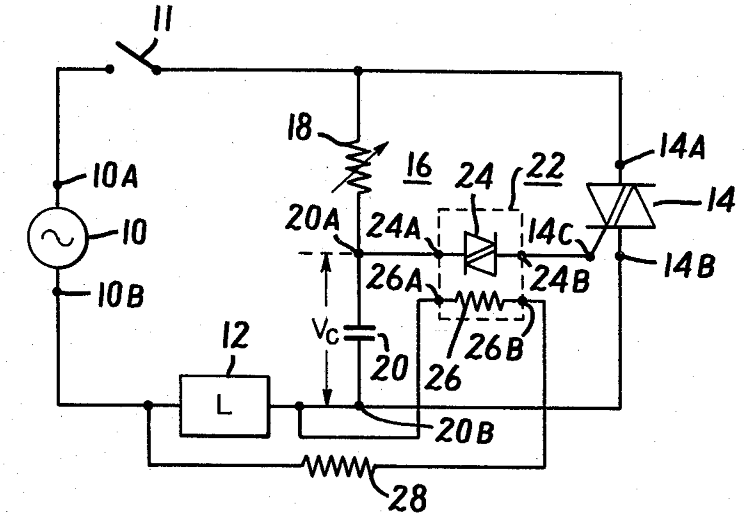
FIG. 1 is a circuit diagram of a circuit for soft-starting an electric load constructed in accordance with the principles of the present invention.

Referring now to FIG. 1 of the drawing, there is illustrated a circuit for soft-starting an electric load constructed in accordance with the principles of the present invention. The arrangement illustrated comprises a commercial source 10 of alternating current, a manually operated, normally open switch 11 connected across the source 10 through a load 12 and a thyristor 14 serially interconnected, and a trigger circuit for triggering the thyristor 14 generally designated by the reference numeral 16. The load 12 is of the type in which an excessive rush current occurring upon starting come particularly in question and may be an electric lamp, an electric motor, an electric heater or the like. The thyristor 14 is shown in FIG. 1 as being a bidirectional triode thyristor including a pair of main terminals 14A and 14B and a control or gate terminal 14C. The main terminal 14A is connected to one terminal 10A of the source 10 while the main terminal 14B is connected to the other terminal 10B of the source 10 through the load 12. As a result, the thyristor 14 is serially connected to the load 12 as above described.

As will be well known, the bidirectional triode thyristor 14 has the ability to be triggered in its ON state with a voltage having a first polarity rendering the main terminal 14A positive with respect to the main terminal 14B thereof and also with a voltage having a second polarity rendering the main terminal 14B positive with respect to the main terminal 14A thereof. During the application of a voltage with the first polarity across the main terminals 14A and 14B of the thyristor 14, the latter is responsive to a triggering current flowing from the gate terminal 14C toward the main terminal 14B to be turned on, while during the application of a voltage with the second polarity across the main terminal 14A and 14B, the thyristor 14 is responsive to a triggering current flowing from the main terminal 14B toward the gate electrode 14C to be turned on.

As shown in FIG. 1, the trigger circuit 16 includes a variable resistor 18, a capacitor 20 and a thermally responsive element generally designated by the reference numeral 22. The variable resistor 18 is serially connected to one terminal 10A of the source 10 through the normally open switch 11 and also it is serially connected to the capacitor 20 across the thyristor 14.

More specifically, the capacitor 20 includes one terminal 20A connected to the main terminal 14A of the thyristor 14 through the variable resistor 18 and the other terminal 20B connected to the main terminal 14B thereof and further to the other terminal 10B of the source 10 through the load 12.

The thermally responsive element 22 includes a semiconductor thermally sensitive switch 24 including one terminal 24A connected to the terminal 20A of the capacitor 20A or the junction of the capacitor 20A and the variable resistor 18 and the other terminal 24B connected to the gate terminal 14C of the thyristor 14, and an electric heater shown as being a resistor 26. The electric heater 26 is thermally coupled to the semiconductor thermally sensitive switch 24 and connected across the load 12 through a current limiting resistor 28.

The semiconductor thermally sensitive switch 24 is a semiconductor element of the type capable of restorably exhibiting the break-over phenomenon and in the example illustrated, it is responsive to either a voltage having a first polarity that the terminal 24A is positive with respect to the terminal 24B and exceeding a predetermined magnitude or a voltage with a second polarity rendering the terminal 24B positive with respect to the terminal 24A and in excess of a predetermined magnitude to be broken over. More specifically, the semiconductor thermally sensitive switch 24 is a semiconductor element having a PNP or an NPN three layer structure in which an intermediate semiconductor layer of one type condictivity is sandwiched between a pair of outer semiconductor layers of the other conductivity type to form a pair of PN junctions there between and including an electrode disposed in ohmic contact with each of the outer semiconductor layer. Those electrodes are the electrodes 24A and 24B as shown in FIG. 1.

When a voltage with the first or second polarity as above described applied across the semiconductor thermally sensitive switch 24 reaches a predetermined magnitude, the break-over phenomenon occurs in the switch 24 whereby the switch 24 is conducting between the terminals 24A and 24B. That voltage with which the break-over phenomenon occurs is called a "break-over voltage" expressed by $V_{BO}$. Such semiconductor switches may be commercially available under the trade mark DIAC from the General Electric Company in USA. Semiconductor thermally sensitive switches called DIAC are bilateral trigger diodes and have the outer semiconductor layers and the associated electrodes constructed and arranged symmetrically with respect to the intermediate semiconductor layer and therefore the break-over voltage with the first polarity is substantially equal in magnitude to that having the second polarity.

Figure 2A:
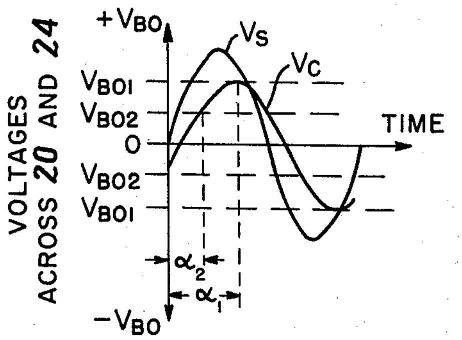
FIG. 2*a* is a graph illustrating voltage waveforms developed across the thyristor and capacitor shown in FIG. 1.
Figure 2C:
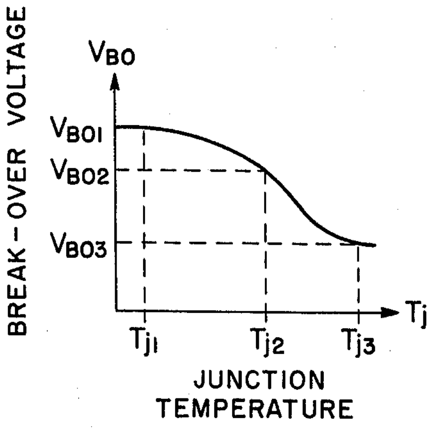
FIG. 2*c* is a graph illustrating the relationship between a break-over voltage of the semiconductor thermally sensitive switch shown in FIG. 1 and a temperature at the junction therein.

The break-over voltage $V_{BO}$ depends upon a temperature at the associated PN junctions as shown in FIG. 2*c* wherein the break-over voltage $V_{BO}$ is potted in ordinate against the temperature $T_j$ at the associated P-N junction in abscissa for a semiconductor thermally sensitive switch called "DIAC". As shown in FIG. 2*c*, if the junction temperature $T_j$ is successively increased to $T_{j1}$, $T_{j2}$ and $T_{j3}$ then the corresponding break-over voltage $V_{BO}$ is successively decreased to $V_{BO1}$, $V_{BO2}$ and $V_{BO3}$ respectively. As also shown in FIG. 2*c*, the break-over voltage $V_{BO}$ is maintained substantially constant at temperatures exceeding the $T_{j3}$ that may range for example, from 60° to 70°C. In FIG. 2*c* the $T_{j1}$ indicates room temperature.

The electric heater or heating resistor 26 is thermally coupled to the semiconductor thermally sensitive switch 24 so that when energized, it is heated to permit the junction temperature $T_j$ of the switch 24 to change. Where the switch 24 is disposed within a closed housing, the heater 24 may be disposed so as to externally heat this housing but the heater may be preferably disposed within the housing to enhance the thermal coupling between the same and the switch.

The arrangement as shown in FIG. 1 is operated as follows: Before and upon the closure of the switch 11, the semiconductor thermally sensitive switch 24 has the junction temperature $T_j$ maintained at room temperature $T_{j1}$ and therefore the break-over voltage of thereof is of $B_{BO1}$. FIG. 2*a* shows a change in a voltage $V_S$ across the source 10 and also a change in a voltage $V_C$ across the capacitor 20 upon the closure of the switch. With the switch 11 brought in its closed position, the source voltage with a first polarity rendering the terminal 10A positive with respect to the terminal 10B causes the capacitor 24 to be charged with a first polarity. That is, the capacitor 24 is charged so that the terminal 20A becomes positive with respect to the terminal 20B. On the other hand, the source voltage with the opposite polarity causes the capacitor 24 to be charged with a second polarity so that the terminal 20B is maintained positive with respect to the terminal 20A.

Figure 2B:
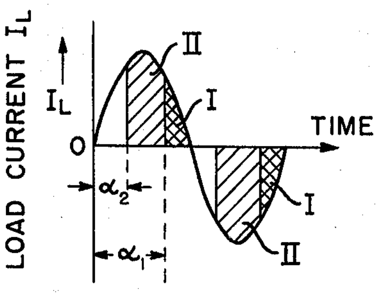
FIG. 2*b* is a graph illustrating the conduction time of the thyristor shown in FIG. 1

It is now assumed that, after the closure of the switch 11, the voltage $V_c$ across the capacitor 20 reaches a magnitude $V_{BO1}$ of the break-over voltage of $V_{BO}$ of the semiconductor thermally sensitive switch 24 at a phase angle of $\alpha_1$ lagging behind of the source voltage $V_S$ as shown in FIG. 2*a*. Under the assumed condition, the break-over phenomenon occurs in the thermally sensitive switch 24 at the phase angle of $\alpha_1$ of the source voltage $V_s$ with each of the first and second polarities resulting in the thyristor 14 being triggered to its conducting state. Therefore the thyristor 14 has a firing angle controlled to the $\alpha_1$ in each cycle of the source voltage. Under these circumstances, a load current $I_L$ flows through the load in each half cycle of the source voltage $V_S$ which current has a waveform I as shown by a cross-hatched portion in FIG. 2*b*.

It is noted that in each half cycle of the source voltage $V_S$ having the first polarity, the firing of the thyristor 14 is accomplished by a discharging current from the capacitor 20 flowing through the gate terminal 14C to the main terminal 14B of the thyristor 14 due to the charged voltage with the first polarity on the capacitor 20 reaching the break-over voltage of $V_{BO1}$ of the thermally sensitive switch 24 to cause the break-over of the latter. In each of the remaining half cycles in which the source voltage $V_s$ has the second polarity, the capacitor 20 is charged with the second polarity until the voltage across the capacitor 20 reaches the break-over voltage of $-V_{BO}$ of the thermally sensitive switch 24 to cause the break-over of the latter. At that time, a discharging current from the capacitor 20 flows through the main terminal 14B to the gate terminal 14*c* of the thyristor thereby to turn the thyristor on.

On the other hand, the load current $I_L$ flowing through the load 12 causes a voltage across the load 12 whose magnitude is proportional to the magnitude thereof. Therefore, due to that voltage, a current proportional to the load current flows through the electric heater 26 to heat it. This results in a gradual increase in the junction temperature $T_j$ of the thermally sensitive switch 24. It will be appreciated that, immediately after the closure of the switch 11, the load current $I_L$ is low because the firing angle $\alpha_1$ of the thyristor 14 is large with the result that the junction temperature $T_j$ of the thermally sensitive switch 24 is slowly raised.

As shown in FIG. 2c, the break-over voltage $V_{BO}$ of the thermally sensitive switch 24 is decreased as the junction temperature $T_j$ thereof is increased. Thus the firing angle $\alpha_1$ of the thyristor 14 is gradually decreased. As a result, the load current $I_L$ is increased to cause an increase in the current flowing through the electric heater 26. This results in a further increase in the junction temperature $T_j$ of the switch 24. If the junction temperature $T_j$ reaches $T_{j2}$ then the break-over voltage $V_{BO}$ of the thermally sensitive switch 24 correspondingly falls to $V_{BO2}$. In that event, the voltage $V_c$ across the capacitor 20 reaches the break-over voltage of $B_{VO2}$ of the thermally sensitive switch 24 at a phase angle of $\alpha_2$ lagging behind of the source voltage $V_s$, the $\alpha_2$ being smaller than the $\alpha_1$. Therefore the thyristor 14 fires at its firing angle of $\alpha_2$ smaller than the firing angle of $\alpha_1$ with the result that the load current $I_L$ flowing through the load 12 becomes higher as shown by the sum of the cross-hatched portion I and a hatched portion II in FIG. 2b.

After the junction temperature $T_j$ of the thermally sensitive switch 24 has further increased to reach the $T_{j3}$, the switch 24 has the break-over voltage maintained at the substantially constant magnitude of $V_{BO3}$. This results in a flow of steady-state load current through the load 12. The steady-state load current can be changed by adjusting the magnitude of resistance of the variable resistor 18.

The present invention has several advantages. For example, an excessive current occurring upon initiating a current to flow through the load can be automatically suppressed without the necessity of adjusting the variable resistor 18. This means that the variable resistor 18 is required only to be controlled to adjust the magnitude of the steady-state load current resulting in the very simple control of the same. Also by changing the thermal coupling between the semiconductor thermally sensitive switch 24 and the electric heater 26 or by varying the magnitude of resistance of the current limiting resistor 28 serially connected to the electric heater 26, the thyristor 14 can be controlled in a change in its time constant required to reach steady-state load current after the closure of the switch 11 and independently of circuit parameters of the triggering circuit 16.

While the present invention has been illustrated and described in conjunction with a single preferred embodiment thereof it is to be understood that numerous changes and modifications may resorted to without departing from the spirit and scope of the present invention. For example, the semiconductor thermally sensitive switch 24 may be replaced by a bidirectional diode thyristor or a bidirectional triode thyristor. Such bidirectional thyristors have the PNPN or NPNP four layer structure including four PN junctions as well known in the art and are responsive to a voltage having a first polarity that one of the main terminal is positive with respect to the other main terminal and reaching a predetermined magnitude to be broken over to switch the impedance between the main terminals from a high magnitude to a low magnitude. This is true in the case of a voltage with the opposite polarity. These thyristors have the break-over voltage $V_{BO}$ dependent upon the junction temperature $T_j$ in the manner similar to that shown in FIG. 2c. Further a bidirectional triode thyristor may be substituted for the thyristor 14. In that event, the thyristor 14 is operative only to control a load current resulting from a voltage across the source having a predetermined polarity and therefore, the thermally sensitive switch is required only to comprise a semiconductor element exhibiting the breakover phenomenon with the corresponding polarity alone, for example, a unidirectional diode thyristor. If desired, the arrangement of FIG. 1 may have added thereto a known circuit for eliminating the hysteresis of the controlled output from the thyristor 14.

What is claimed is:

1. A circuit for soft-starting an electric load, comprising, in combination, thyristor means serially connected to an electric load across a source of alternating current, circuit means including a capacitor connected to said source and a semiconductor thermally sensitive switch element having a break-over voltage decreased with an increase in temperature, said circuit means being operative to trigger said thyristor in response to said break-over of said semiconductor thermally sensitive switch element due to a voltage across said capacitor exceeding said break-over voltage of said semiconductor thermally sensitive switch element, and electric heater means thermally coupled to said semiconductor thermally sensitive switch element to be electrically energized during a flow of load current through said load.

2. A circuit for soft-starting an electric load as claimed in claim 1, wherein said electric heater means is energized with a current proportional to said load current.

3. A circuit for soft-starting an electric load as claimed in claim 1 wherein said capacitor in said circuit means is serially connected to a variable resistor across said source of alternating current.

4. A circuit for soft-starting an electric load as claimed in claim 1 wherein said thyristor means is a bidirectional thyristor and said semiconductor thermally sensitive element is a semiconductor element capable of being broken over in each of the opposite directions.

5. A circuit for soft-starting an electric load as claimed in claim 2 wherein said electric heater means is connected in parallel to said load.

6. A circuit for soft-starting an electric load as claimed in claim 4 wherein said semiconductor thermally sensitive switch element includes three semiconductor layers of alternate conductivity type difining two P-N junctions, and said electric heater means is positioned to change a temperature at each of said P-N junctions.

7. A circuit for soft-starting an electric load as claimed in claim 4 wherein said semiconductor thermally sensitive switch element is a bidirectional thyristor including four P-N junctions and said electric heater means is positioned to change a temperature at each of said P-N junctions.

* * * * *